(12) United States Patent
Thompson

(10) Patent No.: US 12,515,357 B2
(45) Date of Patent: Jan. 6, 2026

(54) APPARATUS FOR TRANSLATING MOVEMENT OF A ROTATING SHAFT TO ROTATIONAL MOVEMENT IN TWO DIMENSIONS OF A LEVER ARM

(71) Applicant: David Thompson, Fredonia, NY (US)

(72) Inventor: David Thompson, Fredonia, NY (US)

( * ) Notice: Subject to any disclaimer, the term of this patent is extended or adjusted under 35 U.S.C. 154(b) by 0 days.

(21) Appl. No.: 18/725,437

(22) PCT Filed: Dec. 30, 2022

(86) PCT No.: PCT/US2022/082637
§ 371 (c)(1),
(2) Date: Jun. 28, 2024

(87) PCT Pub. No.: WO2023/130080
PCT Pub. Date: Jul. 6, 2023

(65) Prior Publication Data
US 2025/0109782 A1    Apr. 3, 2025

Related U.S. Application Data

(63) Continuation of application No. 17/646,592, filed on Dec. 30, 2021.

(51) Int. Cl.
*B25J 17/00*      (2006.01)
*B25J 18/00*      (2006.01)
*F16H 21/52*      (2006.01)

(52) U.S. Cl.
CPC .............. *B25J 17/00* (2013.01); *B25J 18/007* (2013.01); *F16H 21/52* (2013.01)

(58) Field of Classification Search
CPC ......... B25J 17/00; B25J 18/007; F16H 21/52; F16H 21/48; F16D 3/40; B62D 57/032
See application file for complete search history.

(56) References Cited

U.S. PATENT DOCUMENTS 4,723,460 A    2/1988  Rosheim
6,866,557 B2 *  3/2005  Randall .................. B62D 57/02
                                               446/330

(Continued)

FOREIGN PATENT DOCUMENTS

CN     201390303 Y    1/2010
CN     107651039 A    2/2018
WO     2004005119 A1  1/2004

*Primary Examiner* — Terence Boes
(74) *Attorney, Agent, or Firm* — Simpson & Simpson, PLLC

(57) ABSTRACT

An apparatus and adjustable apparatus, for translating movement of a rotating shaft to rotational movement in two dimensions of a lever arm including a first frame and a second frame, a first shaft rotatably connected to the first frame and arranged for rotation about a first axis of rotation, a lever having a fulcrum, wherein the fulcrum is arranged within the second frame and arranged for pivoting about a second axis of rotation, wherein the second axis of rotation is coplanar with the first axis of rotation, wherein the second frame is rotatably connected to the first frame, the second frame arranged for rotation with respect to the first frame about a third axis of rotation, wherein the third axis of rotation is arranged perpendicularly and spaced apart from the first axis of rotation, wherein the first, second, and third axes have single point of intersection.

8 Claims, 11 Drawing Sheets

(56) References Cited

U.S. PATENT DOCUMENTS

| | | |
|---|---|---|
| 10,221,992 B2* | 3/2019 | Rushworth ............ B25J 9/0057 |
| D847,242 S | 4/2019 | Kawaguchi et al. |
| 10,883,579 B2* | 1/2021 | Rubens .................. B24B 27/08 |
| 2009/0314118 A1 | 12/2009 | Li |
| 2016/0158786 A1 | 6/2016 | Christensen |
| 2016/0346939 A1 | 12/2016 | Hares et al. |
| 2020/0406484 A1 | 12/2020 | Iida et al. |
| 2023/0211513 A1* | 7/2023 | Thompson ............. F16H 21/52 |
| | | 74/498 |

* cited by examiner

US 12,515,357 B2

APPARATUS FOR TRANSLATING MOVEMENT OF A ROTATING SHAFT TO ROTATIONAL MOVEMENT IN TWO DIMENSIONS OF A LEVER ARM

CROSS-REFERENCE TO RELATED APPLICATIONS

This application claims the benefit under Articles 4 and 8 of the Stockholm Act of the Paris Convention for the Protection of Industrial Property of U.S. patent application Ser. No. 17/646,592, filed on Dec. 30, 2021, which application is hereby incorporated by reference herein in its entirety.

FIELD

The present invention relates generally to a lever that produces a circular and simultaneous angular rotation, specifically producing the circular and simultaneous angular rotation from strictly rotational movement. The present invention also relates to an adjustable lever and corresponding adjustable frame that produces a circular and simultaneous angular rotation, specifically producing the circular and simultaneous angular rotation from strictly rotational movement.

BACKGROUND OF THE INVENTION

A lever is a simple machine used to lift and move heavy materials with a small amount of force. Typically, a lever consists of a beam, or a rod pivoted at a hinge or a fulcrum. This orientation creates a mechanical advantage by allowing the amplification of an input force to provide a greater output force. This load to effort ratio allows the system to decrease the effort it takes to pick up a load. Thus, a lever enables one to do work with minimal effort.

The primary focus of a lever is to amplify physical force to move or lift objects. At one end of the lever, a large force is exerted over a small distance, whereas at the other end of a lever, only a small force is exerted over a greater distance. Accordingly, levers are split into three different classifications. In a class 1 lever, the fulcrum is placed between the effort and the load so that the movement of the load is in the opposite direction of the movement of the effort. Class 1 levers are both force multiplying and distance multiplying. Further, in a class 2 lever, the load is placed between the effort and the fulcrum so that the movement of the load is in the same direction as the effort. Class 2 levers are strictly force multiplying. Even further, in a class 3 lever, the effort is between the load and the fulcrum so that the effort and the load are in the same direction. Class 3 levers are strictly distance multiplying.

Typically, the motion of a lever is limited to movement in the X-axis and the Y-axis. This position directs movement in the rightward, leftward, upward, and downward directions. Thus, conventional levers are limited to linear movement.

Thus, there is a long-felt need for a lever system with broader movement capabilities. Further, there is a long-felt need for a lever that can rotate simultaneously about at least two separate axes to produce a circular motion at both ends of the lever. Still further, there is a long-felt need for a lever have adjustable components and providing the aforementioned benefits.

SUMMARY OF THE INVENTION

The present invention broadly comprises an apparatus for translating movement of a rotating shaft to rotational movement in two dimensions of a lever arm comprising, a first frame, a second frame, a first shaft rotatably connected to the first frame and arranged for rotation about a first axis of rotation, a heim joint fixedly secured to a distal end of the first shaft, a lever having a fulcrum, the lever having a first end and a second end, where a distance between the fulcrum and the first end is less than a distance between the fulcrum and the second end, the first end of the lever rotatably connected to the heim joint, wherein the fulcrum is arranged within the second frame and arranged for pivoting about a second axis of rotation, wherein the second axis of rotation is co-planar with the first axis of rotation, wherein the second frame is rotatably connected to the first frame, the second frame arranged for rotation with respect to the first frame about a third axis of rotation, wherein the third axis of rotation is arranged perpendicularly and spaced apart from the first axis of rotation, wherein the first, second, and third axes have single point of intersection.

An alternative embodiment of the present invention provides an apparatus for translating movement of a rotating shaft to rotational movement in three dimensions of a lever arm comprising, a first frame, a second frame rotatably connected to the first frame, a third frame rotatably connected to the first frame, a fourth frame rotatably connected to the third frame, a first shaft rotatably connected to the first frame and arranged for rotation about a first axis of rotation, a heim joint fixedly secured to a distal end of the first shaft, a lever having a fulcrum, the lever having a first end and a second end, where a distance between the fulcrum and the first end is less than a distance between the fulcrum and the second end, the first end of the lever rotatably connected to the heim joint, wherein the fulcrum is arranged within the second frame and arranged for pivoting about a second axis of rotation, wherein the second axis of rotation is co-planar with the first axis of rotation, wherein the second frame is rotatably connected to the first frame, the second frame arranged for rotation with respect to the first frame about a third axis of rotation, wherein the third axis of rotation is arranged perpendicularly and spaced apart from the first axis of rotation, wherein the first, second, and third axes have a single point of intersection, a second shaft rotatably connected to the fourth frame and rotatably connected to the first shaft via a universal joint, the third frame arranged for rotation with respect to the first frame about a fourth axis of rotation, wherein the fourth axis of rotation is arranged perpendicularly and spaced apart from the first axis of rotation, wherein the fourth frame is arranged for rotation with respect to the third frame about a fifth axis of rotation, wherein the fifth axis of rotation is arranged perpendicularly from the fourth axis of rotation, wherein the fifth axis is co-planar with the first axis of rotation, wherein the second shaft is arranged for rotation about a sixth axis of rotation, wherein the first, fourth, fifth, and sixth axes of rotation have a single point of intersection.

In other configurations, the present invention may generally comprise an apparatus for translating movement of a rotating shaft to rotational movement in two dimensions of a lever arm, the apparatus comprising a first frame having an adjustable length, a second frame rotatably connected to the first frame, a first shaft rotatably connected to the first frame and arranged for rotation about a first axis of rotation, a heim joint fixedly secured to a distal end of the first shaft, an adjustable-length lever having a fulcrum, the lever having a first end and a second end, where a distance between the fulcrum and the first end is less than a distance between the fulcrum and the second end, the first end of the lever rotatably connected to the heim joint, wherein the fulcrum is arranged within the second frame and arranged for pivoting about a second axis of rotation, wherein the second axis of rotation is co-planar with the first axis of rotation, wherein the second frame arranged for rotation with respect to the first frame about a third axis of rotation, wherein the third axis of rotation is arranged perpendicularly and spaced apart from the first axis of rotation, wherein said first, second, and third axes have single point of intersection.

A primary object of the invention is to provide a lever that is not limited to linear movement.

Another object of the invention is to provide a lever that may be positioned adjacently with like-levers to generate a walking machine, specifically where leg-like fixtures are attached to an end of a lever arm and are arranged to propel the walking machine via a tripod-like gait.

Yet another object of the invention is to provide an adjustable lever that is not limited to linear movement, where a frame of the invention is adjustable, and the lever is also adjustable.

These and other objects, features and advantages of the invention will become readily apparent to one having ordinary skill in the art upon study of the following detailed description in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, whereas:

FIG. 5A is a detailed view of 90° connector 70;

FIG. 5B is a detailed view of T-swivel connector 80;

DETAILED DESCRIPTION OF THE PREFERRED EMBODIMENT

At the outset, it should be appreciated that like reference numbers on different drawing figures represent identical structural elements. It should also be appreciated that, while a number of different embodiments and variations of the present invention are shown in the various drawings, the invention as claimed is not intended to be limited to these specific embodiments, as the claims define a broader invention that can take many different shapes and structures. Also, the adjectives, "top", "bottom", "right", "left", and their derivatives, in the description herebelow, refer to the perspective of one facing the invention as shown in the figure under discussion.

Furthermore, it should be understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices, or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims.

It should also be understood that when referencing an axis, "upward" means along the Y-axis in the positive direction, "downward" means along the Y-axis in the negative direction, "rightward" or "right" means along the X-axis in the positive direction, and "leftward" or "left" means along the X-axis in the negative direction. For example, an "upward right direction", when compared to an axis, means the point of direction is located on an axis with a positive X-value and a positive Y-value.

Figure 1:
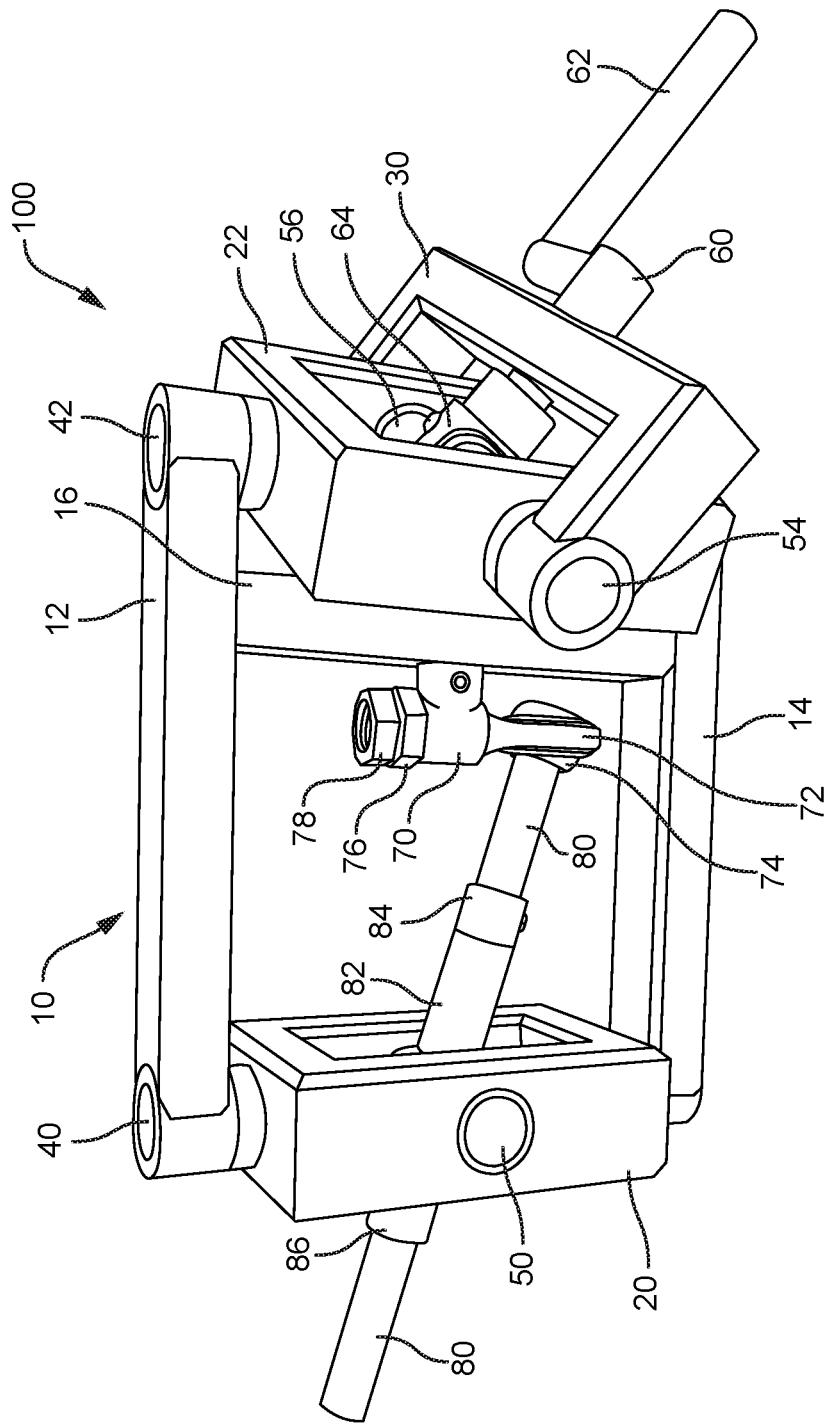
FIG. 1 illustrates a front perspective view of the present invention.
Figure 2:
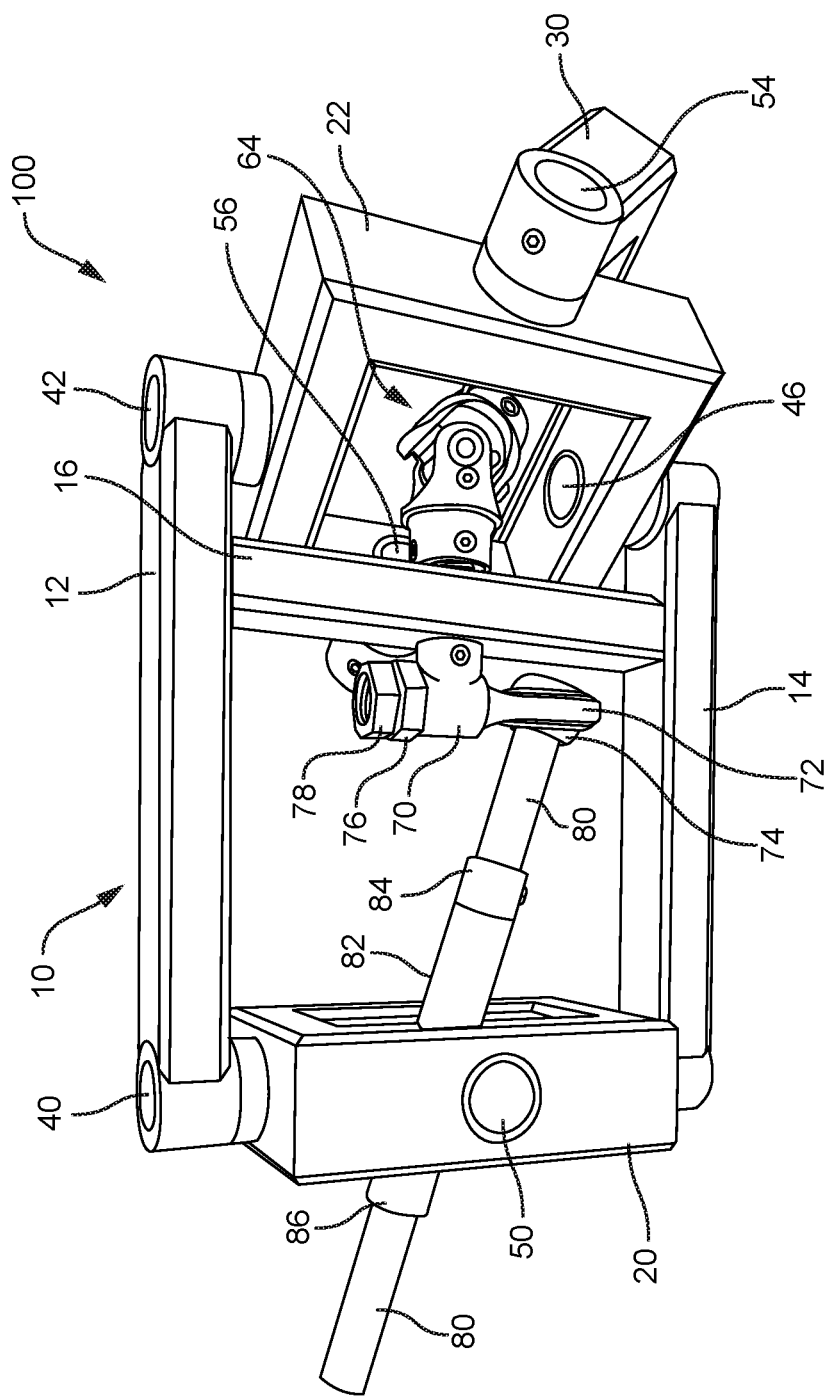
FIG. 2 illustrates a front perspective view of the present invention shown in FIG. 1, specifically showing the third frame of the present invention in a rotated position to reveal the universal joint connection.
Figure 3:
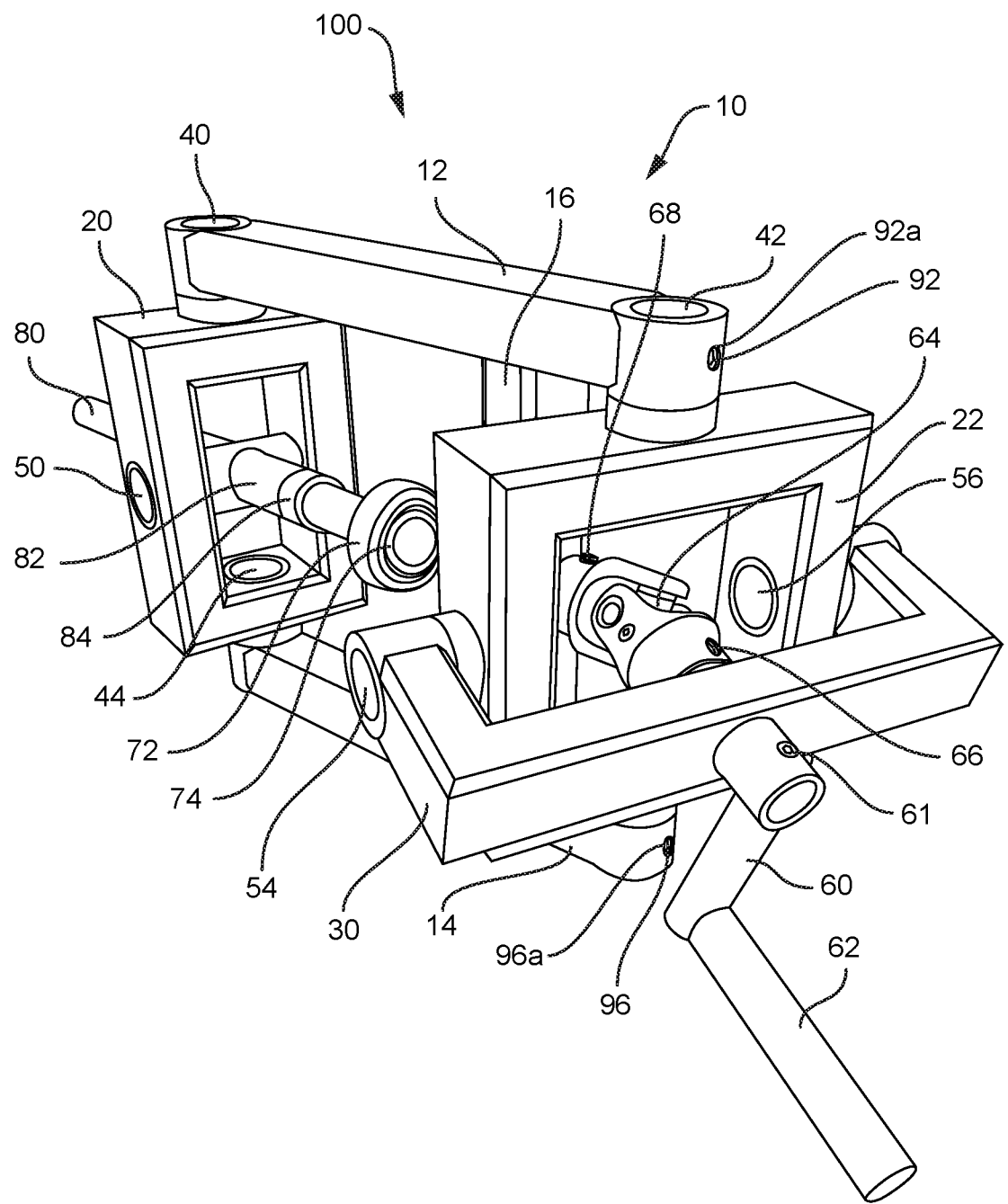
FIG. 3 illustrates a side perspective view of the present invention shown in FIG. 1.

Adverting now to the drawings, the following description should be taken in view of FIGS. 1-4. FIG. 1 illustrates a front perspective view of the present invention, while FIG. 2 illustrates another front perspective view of the present invention where the third frame is rotated. FIG. 3 illustrates a side perspective view of the present invention shown in FIGS. 1 and 2. Circular-angular lever device 100 comprises support frame 10 that specifically includes first support arm 12, second support arm 14, and connecting arm 16. Connecting arm 16 has two ends that are fixedly secured to first support arm 12 and second support arm 14. Connecting arm 16 is exemplarily shown as a vertical member between first support arm 12 and second support arm 14. Connecting arm 16 also includes through-bore 81c (shown in FIG. 4) that is preferably positioned in a substantially central location, discussed further infra. First support arm 12 includes two through-bores 40a and 42a, respectively, arranged at opposite terminating ends (shown and discussed further in view of FIG. 4 infra). Second support arm 14 includes two through-bores 44a and 46a, respectively, arranged at opposite terminating ends (shown and discussed further in view of FIG. 4 infra). Through-bores 40a and 42a of first support arm 12 are arranged to each accept pin 40 and pin 42, respectively. Through-bores 44a and 46a of second support arm 14 are arranged to each accept pin 44 and pin 46, respectively (shown and discussed further in view of FIG. 4 infra). Pin 40 of first support arm 12 and pin 44 of second support arm 14 are both longer in length than their respective through-bores, leaving a section of pin 40 and pin 44 extending outwardly from their respective through-bores. A lower section of pin 40 extends downwardly external of through-bore 40a to rotatably engage through-bore 40b of first swing frame 20 and an upper section of pin 44 extends upwardly external of through-bore 44a to rotatably engage through-bore 44b of first swing frame 20.

Figure 4:
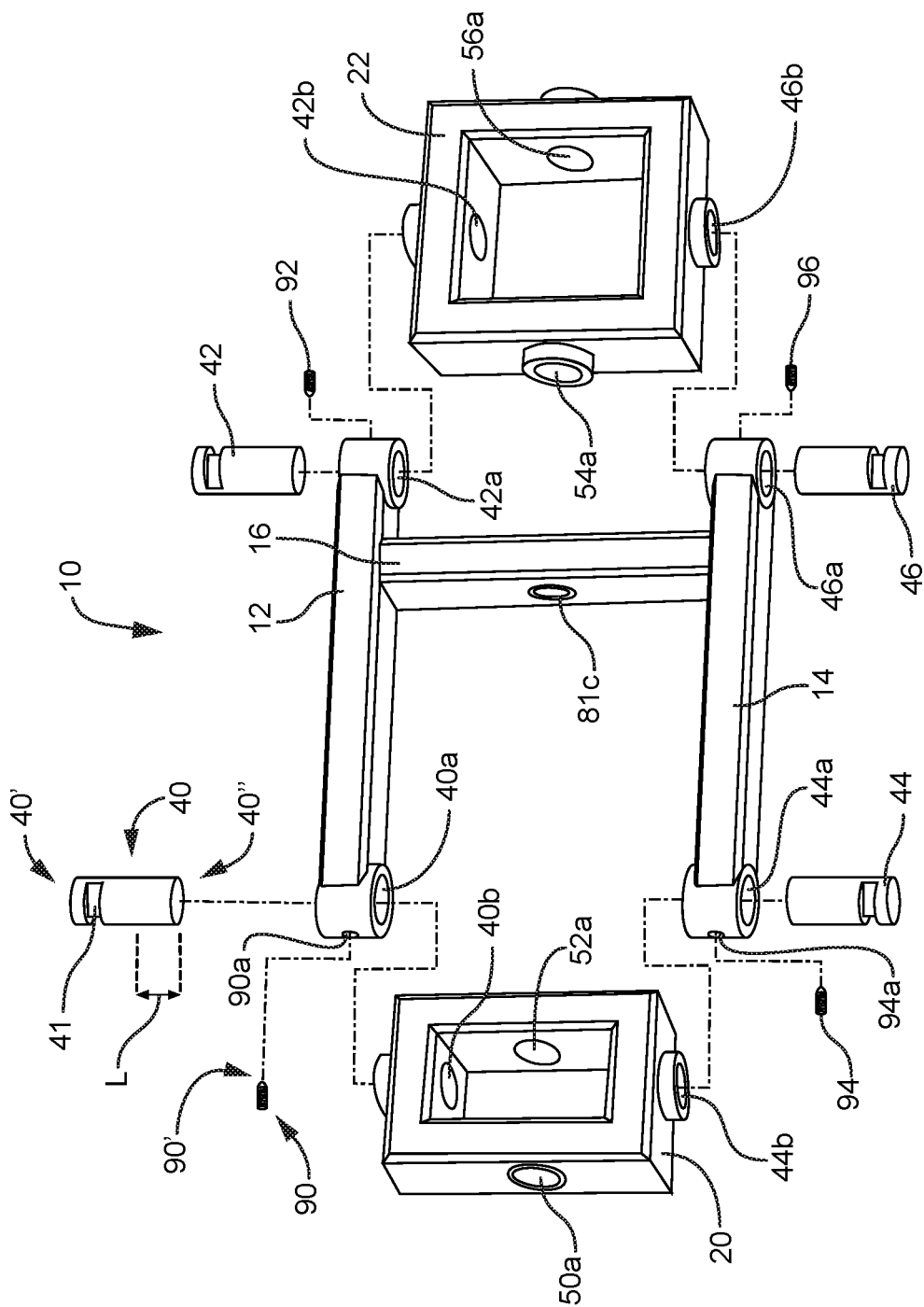
FIG. 4 illustrates an exploded view of the first frame, the second frame, the third frame, and their respective securement means of the present invention shown in FIG. 1.

Also as shown in FIG. 4, first swing frame 20 also includes a left through-bore 50a and a right through-bore 52a arranged to accept pin 50 (shown in FIG. 5) and pin 52 (shown in FIG. 5), respectively. Pin 50 and pin 52 are both longer in length than through-bores 50a and 52 of first swing frame 20, leaving a section of pin 50 and pin 52 extending therefrom. The sections of pin 50 and pin 52 that extend from through-bores 50a and 52 are arranged to engage T-swivel connector 82, rotatably securing T-swivel connector 82 to first swing frame 20, discussed further, infra. T-swivel connector 82 is a fulcrum.

Through-bore 81c of support arm 16 of support frame 10 is arranged to accept first rotational shaft 81 (shown in FIG. 5), which leaves a section of the first rotational shaft exposed in a direction towards first swing frame 20. The exposed section of first rotational shaft 81 is further arranged to engage 90° connector 70 therein. Socket connector 72 comprises spherical connector 74. Socket connector 72 engages 90° connector 70 therein, and is secured to 90° connector 70 via first lock nut 76 and second lock nut 78. Seated within socket connector 72 is spherical connector 74 which may pivot freely within socket connector 72. Socket connector 72 and spherical connector 74 in a preferred embodiment comprise a heim or rose joint.

Second end 81b of first rotational shaft 81 is arranged to engage universal joint 64. Universal joint 64 is a universal joint mechanism or a Hooke's coupling that allows rotatory movement from each respective end allowing for various relative angles and displacements between the driver (i.e., crank 60) and the follower (i.e., first rotational shaft 81). First rotational shaft 81 connects universal joint 64 to 90° connector 70 and second rotational shaft 83 connects universal joint 64 to crank 60. Specifically, first end 83a of second rotational shaft 83 is arranged to engage universal joint 64 and second end 83b of second rotational shaft 83 is arranged to engage crank 60 (further illustrated in FIG. 6). Universal joint 64 includes first pin through-bore 66 and second pin through-bore 68 that are both arranged to accept a threaded securement pin that is substantially identical to threaded pin 90 and pin through-bore 90a illustrated in FIG. 4. First pin through-bore 66 accepts a threaded pin that frictionally secures the second rotational shaft within universal joint 64 and second pin through-bore 68 accepts a threaded pin that frictionally secures the first rotational shaft within universal joint 64. Universal joint 64 is arranged to move with second swing frame 22 and crank frame 30. Second swing frame 22 is arranged to rotate about pin 42 and pin 46 within swing frame 10. Crank frame 30 is arranged to rotate about pin 54 and pin 56 within second swing frame 22. Crank 60 includes pin through-bore 61 that is arranged to accept a threaded pin that is substantially identical to threaded pin 90 and pin through-bore 90a illustrated in FIG. 4 and is further arranged to frictionally secure the second rotational shaft within crank 60. Crank 60 also includes handle 62. It should be appreciated that crank 60 is merely exemplary and that the second rotational shaft could be secured to a motor shaft that would motorize the movement of circular-angular lever device 100.

Lever arm 80 has two terminating ends, where one of the terminating ends is arranged to engage the through-bore of spherical connector 74. Lever arm 80 is arranged to be seated within T-swivel connector 82. T-swivel connector 82 also is arranged to accept pin 50 and pin 52 (via through-bores 82d and 82c, respectively, shown in FIG. 5B) that are engaged with first swing frame 20 via through-bores 50a and 52a, respectively, thereby rotatably securing T-swivel connector 82 and Lever arm 80 therein to first swing frame 20. Lever arm 80 is secured within T-swivel connector 82 via first shaft collar 84 and second shaft collar 86.

It should be appreciated that T-swivel connector 82 is a fulcrum, specifically a fulcrum that is arranged to move a lever, i.e., lever arm 80.

FIG. 4 is an exploded view of support frame 10, first swing frame 20, second swing frame 22, and their respective securement means of circular-angular lever 100 shown in FIGS. 1-3. First support arm 12 of support frame 10 has first pin through-bore 40a and second through-bore 42a arranged at opposite ends of first support arm 12. Second support arm 14 of support frame 10 has first pin through-bore 44a and second pin through-bore 46a of second support arm 14 arranged at opposite ends of second support arm 14. First swing frame 20 includes first pin through-bore 40b and third pin through-bore 44b of first swing frame 20, arranged on the top and bottom of first swing frame 20, respectively. Second swing frame 22 includes first pin through-bore 42b and second pin through-bore 46b of second swing frame 22, arranged on the top and bottom of second swing frame 22, respectively. Each of pin through-bores 40a, 42a, 44a, and 46a of support frame 10 include threaded through-bores 90a, 92a, 94a, and 96a, respectively. Threaded through-bores 90a, 92a, 94a, and 96a are all arranged to accept threaded pins 90, 92, 94, and 96.

Pin 40 includes groove 41, which is a cut-out channel of pin 40, preferably located proximate to first end 40' of pin 40. When pin 40 is engaged within through-bore 40a, exposed length L of pin 40, located at second end 40" of pin 40, protrudes from the bottom of through-bore 40a, i.e., protrudes in the direction towards through-bore 44a. To secure pin 40 within through-bore 40a, threaded pin 90 is threaded into threaded through-bore 90a such that end 90' of threaded pin 90 will pass through threaded through-bore 90a and will be seated within groove 41 of pin 40, thereby securing pin 40 within through-bore 40a. Exposed length L of pin 40 is arranged to engage through-bore 40b of first swing frame 20.

Figure 6:
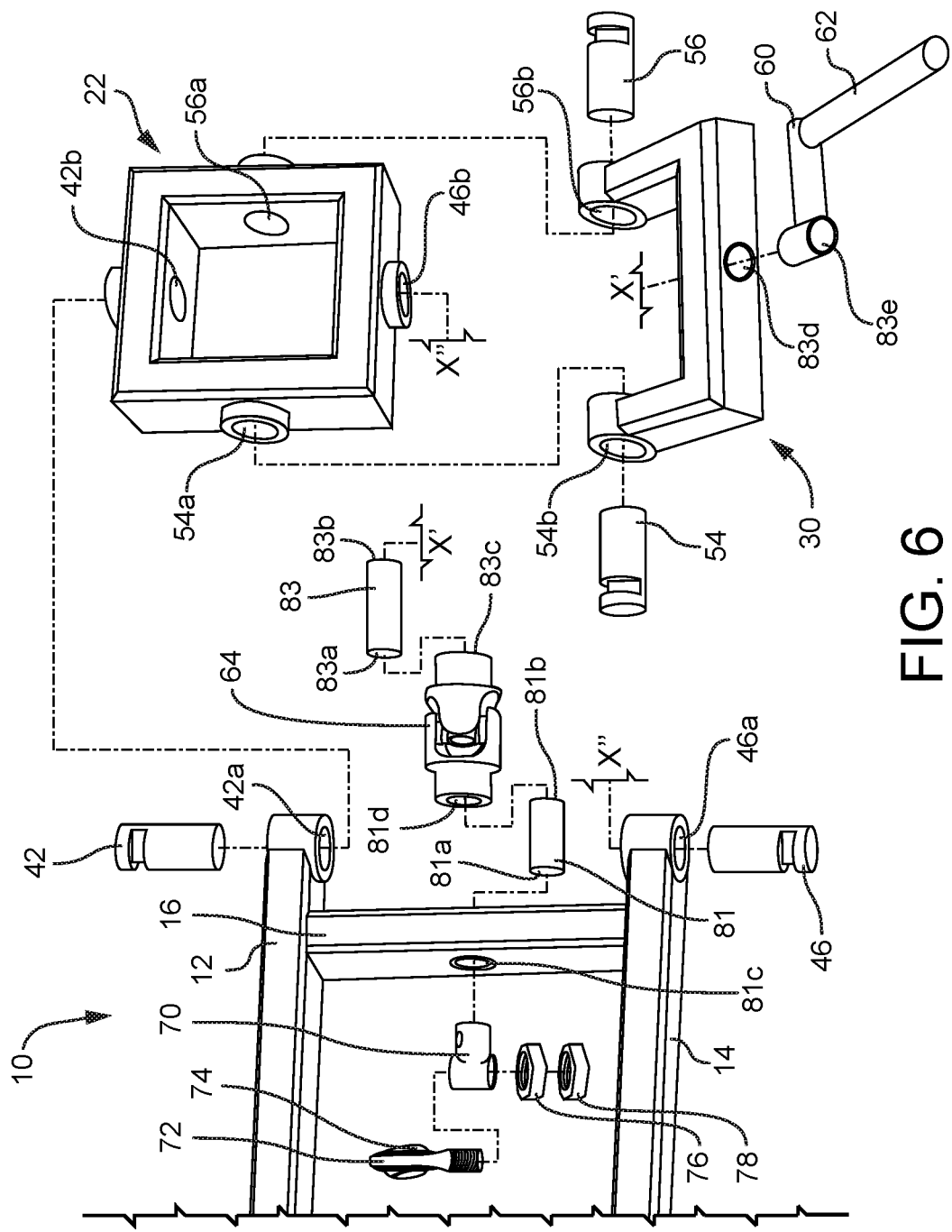
FIG. 6 illustrates a partial exploded view of the first frame, the third frame, the fourth frame, the universal joint, and the crank, of the present invention shown in FIG. 1.

It should be appreciated that pins 40, 42, 44, 46, 50, 52, 54, and 56 are all secured within their respective through-bores in the same fashion described above. It should also be appreciated that although not illustrated, pins 50, 52, 54, and 56 all comprise a groove that is substantially identical to groove 41 or alternatively, comprise a depression or channel. It should be further appreciated that through-bores 50a, 52a, 54b, and 56b (54b and 56b are illustrated in FIG. 6) all comprise a perpendicularly arranged threaded through-bore that is substantially identical to threaded through-bore 90a. It should still be further appreciated that the perpendicularly arranged threaded through-bore that are substantially identical to thread through-bore 90a of through-bores 50a, 52a, 54b, and 56b are all arranged to accept a threaded pin that is substantially identical to threaded pin 90, and those threaded pins have an end substantially identical to end 90' of pin 90 that are all arranged to engage a groove that is substantially identical to groove 41 or alternatively, comprise a depression or channel arranged on pins 50, 52, 54, and 56b.

To secure first swing frame 20 to support frame 10, pin 40 is inserted within pin through-bore 40a and pin through-bore 40b. Pin 40 is secured within pin through-bore 40a via threaded pin 90 within pin through-bore 90a such that end 90' of pin 90 is engaged within groove 41 of pin 40. Threaded pins 92, 94, and 96 all engage a groove of pins 42, 44, and 46, respectively, in the same manner as described above in view of groove 41 of pin 40 and threaded pin 90. Pin 44 is inserted within pin through-bore 44a and pin through-bore 44b. Pin 44 is secured within pin through-bore 44a via threaded pin 94 within pin through-bore 94a such that pin 94 is engaged within the groove located on the outside surface of pin 44. Swing frame 20 freely rotates about pin 40 and 44 when secured to support frame 10. To secure second swing frame 22 to support frame 10, pin 42 is inserted within pin through-bore 42a and pin through-bore 42b. Pin 42 is secured within pin through-bore 42a via threaded pin 92 within pin through-bore 92a such that pin 92 is engaged within the groove located on the outside surface of pin 42. Pin 46 is inserted within pin through-bore 46a and pin through-bore 46b. Pin 46 is secured within pin through-bore 46a via threaded pin 96 within pin through-bore 96a such that pin 96 is engaged within the groove located on the outside surface of pin 46. Second swing frame 22 freely rotates about pin 42 and 46 when secured to support frame 10.

Figure 5:
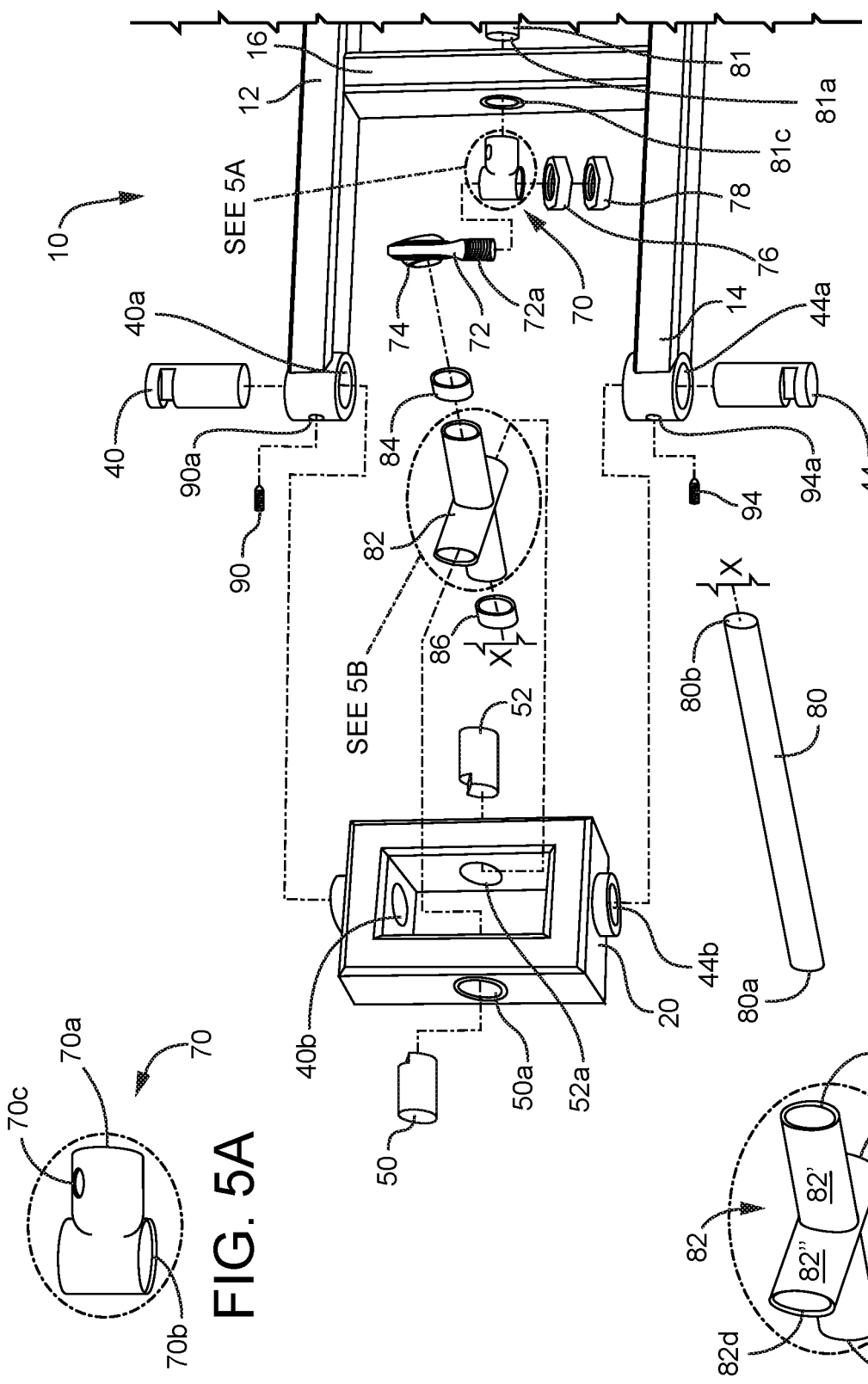
FIG. 5 illustrates a partial exploded view of the first frame, the second frame, and the first arm of the present invention shown in FIG. 1.

It should be appreciated that the method of securement described in view of pins 40, 42, 44, 46 being secured via threaded pins 90, 92, 94, and 96 engaging within threaded through-bores 90a, 92a, 94a, and 96a, supra, is applied to various other components described in view of FIGS. 5 and 6, infra. One with ordinary skill in the art would ascertain that the preferred method of securement of various components of the present invention comprises: a frictional securement of a threaded pin arranged to engage a threaded through-bore therein that provides for an end of the threaded pin to exit the threaded through-bore through an opening arranged oppositely of an opening where the pin is inserted. The threaded pin is tightened to frictionally secure the desired component with the end of the threaded pin that passes through the through-bore which then contacts the component's outside surface or a groove, as described supra and shown in FIG. 4.

For example, in view of FIGS. 5 and 5A, first rotational shaft 81 engages through-bore 70a of 90° connector 70. To secure first rotational shaft 81 within through-bore 70a, a threaded pin that is substantially similar to threaded pin 90, engages threaded through-bore 7c that opens into through-bore 70a of 90° connector 70. When a threaded pin is engaged to threaded through-bore 70c of 90° connector 70, tightening the threaded pin will frictionally press the end of the threaded pin against a depression and/or groove located on an outside surface of first rotational shaft 81, securing first rotational shaft 81 within through-bore 70a of 90° connector 70. It should be appreciated that first rotational shaft 81, second rotational shaft 83, and lever arm 80 all comprise at least one depression and/or a groove that is arranged to engage an end of a threaded pin, that is engaged to a threaded through-bore of a component, to secure at least one component to the first rotational shaft 81, second rotational shaft 83, and/or lever arm 80, or alternatively, to secure the first rotational shaft 81, second rotational shaft 83, and lever arm 80 within a component and/or through-bore. In the following description, the above-described method of securement will be referenced as "threaded pin lock", shown in FIG. 4 and described supra.

The following description should be taken in view of FIGS. 5, 5A, and 5B. FIG. 5 is an exploded view of support frame 10, first swing frame 20, and their respective securement means of circular-angular lever 100 shown in FIGS. 1-3. FIG. 5A is a detailed view of 90° connector 70. FIG. 5B is a detailed view of T-swivel connector 82. First swing frame 20 engages support frame 10 via pin 40 and pin 44, in the manner described above in view of FIG. 4. Connecting arm 16 includes through-bore 81c which is preferably centrally arranged within connecting arm 16. Through-bore 81c is arranged to accept first rotational shaft 81 therein. First rotational shaft 81 includes first end 81a, wherein first end 81a of first rotational shaft 81 is arranged to engage through-bore 70a arranged on 90° connector 70. First rotational shaft 81 is frictionally secured within through-bore 70a of 90° connector 70 via a threaded pin lock. 90° connector 70 also includes through-bore 70b which is perpendicularly arranged in relation to through-bore 70a of 90° connector 70. Socket connector 72 includes threaded shaft 72a that is arranged to fit within through-bore 70b of 90° connector 70 such that threaded shaft 72a of socket connector 72 is exposed through the bottom opening of the through-bore of 90° connector 70. Threaded shaft 72a is secured within the through-bore of 90° connector 70 via first lock nut 76 and second lock nut 78. It should be appreciated that only one lock nut may be needed to secure threaded shaft 72a of socket connector 72 within 90° connector 70.

Once first swing frame 20 is engaged to support frame 10, T-swivel connector 82 may be engaged to first swing frame 20. T-swivel connector 82 best resembles a 4-way pipe cross connector, specifically, connector 82 forms two tubes, lever arm tube 82' and connection tube 82", which are integrally and perpendicularly connected at a substantially central position of each respective tube. In a preferred embodiment, lever arm tube 82' is longer than connection tube 82". Connection tube 82" of T-swivel connector 82 is arranged to accept pin 50 and pin 52 within opposite openings, opening 82d and opening 82c, respectively. Pin 50 is arranged to engage through-bore 50a of first swing frame 20 therein and engage opening 82d of T-swivel connector 82 where pin 50 is secured via threaded pin lock within opening 82d of connection tube 82". Pin 52 is arranged to engage through-bore 52a of first swing frame 20 therein and engage opening 82c of T-swivel connector 82 where pin 52 is secured via threaded pin lock within opening 82c of connection tube 82". When pin 50 and pin 52 are engaged to first swing frame 20 and T-swivel connector 82, T-swivel connector 82 may rotate about pin 50 and pin 52 within first swing frame 20.

Lever tube 82' of T-swivel connector 82 is arranged to accept rotation end 80b of lever arm 80 therein. Rotation end 80b engages spherical connector 74 of socket connector 72. It should be appreciated that spherical connector 74 is preferably a rose joint where spherical connector 74 freely rotates within socket connector 72, oppositely arranged in relation to threaded shaft 72a. Located on an outside surface of lever arm 80 and preferably abutting opening 82a of lever arm tube 82' of T-swivel connector 82 is first shaft collar 84. First shaft collar 84 is secured to lever arm 80 via threaded pin lock. Located on an outside surface of lever arm 80 and preferably abutting opening 82b of lever arm tube 82' of T-swivel connector 82 is second shaft collar 86. Second shaft collar 86 is secured to lever arm 80 via threaded pin lock. First shaft collar 84 and second shaft collar 86 collectively secure lever arm 80 within lever arm tube 82' of T-swivel connector 82 and rotation end 80b within spherical connector 74 of socket connector 72. Lever arm 80 may freely rotate within T-swivel connector 82 and within spherical connector 74 of socket connector 72, such that lever arm 80 in an alternative embodiment may include an apparatus to provide for independent rotation of lever arm 80 therein. Alternatively, lever arm 80 within T-swivel connector 82 and within spherical connector 74 of socket connector 72b may be fixed to prevent rotation by T-swivel connector 82, i.e., threaded pin lock.

FIG. 6 is an exploded view of support frame 10, second swing frame 22, crank frame 30 and their respective securement means of circular-angular lever 100 shown in FIGS. 1-3. First end 81a of first rotational shaft 81 is secured within through-bore 70a of 90° connector 70 and is further arranged to sit within through-bore 81c of connecting arm 16, such that second end 81b of first rotational shaft 81 is oriented in a direction opposite of 90° connector 70. Second swing frame 22 connects to support frame 10 via pins 42 and 46 in the manner described in view of FIG. 4, supra. Second swing frame 22 also includes pin through-bores 54a and 56a. Pin through-bores 54a and 56a are preferably arranged colinearly with each other and further arranged perpendicularly in relation to pin through-bores 42b and 46b. To secure crank frame 30 to second swing frame 22, pin 54 is inserted into and through pin through-bore 54b of crank frame 30 and into pin through-bore 54a of second swing frame. Pin 54 is secured within pin through-bores 54b and 54a via threaded pin lock arranged about pin through-bore 54b of crank frame 30. Pin 56 is also inserted into and through pin through-bore 56b of crank frame 30 and into pin through-bore 56a of second swing frame 22. Pin 56 is secured within pin through-bores 56b and 56a via threaded pin lock arranged about pin through-bore 56b of crank frame 30. When crank frame 30 is secured to second swing frame 22 it may rotate about pins 54 and 56.

Figure 9:
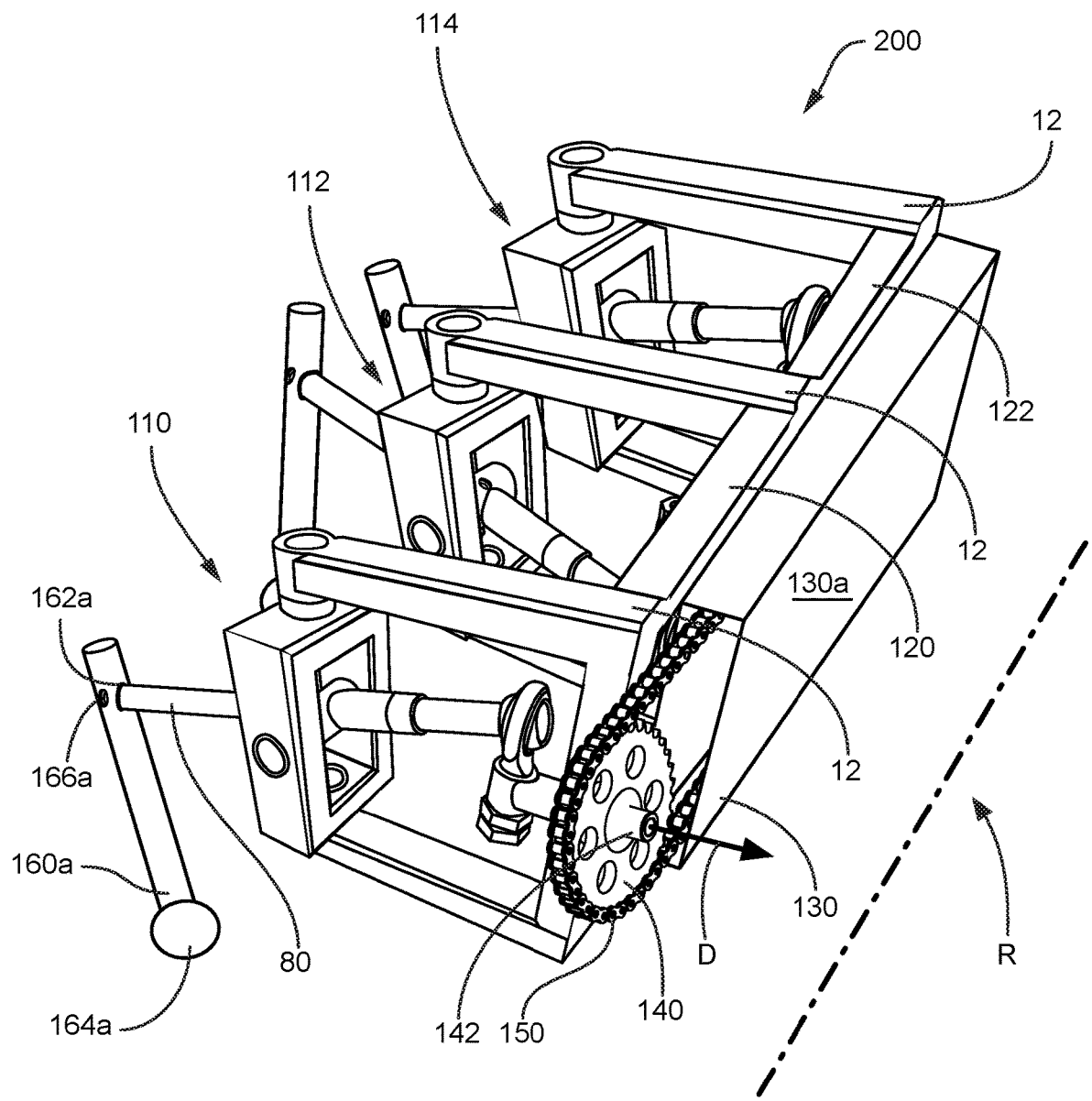
FIG. 9 illustrates a perspective view of apparatuses 110, 112, and 114 joined together and connected to a gear box.

Universal joint 64 has two apertures, first connection aperture 81d and second connection aperture 83c, whereas first connection aperture 81d is arranged to accept second end 81b of first rotational shaft 81 and second connection aperture 83c is arranged to accept first end 83a of second rotational shaft 83. First connection aperture 81d includes threaded pin aperture 68 (shown in FIG. 3) which secures first rotational shaft 81 within first connection aperture 81d via threaded pin lock. Second connection aperture 83c includes threaded pin aperture 66 (shown in FIG. 3) which secures second rotational shaft 83 within second connection aperture 83c via threaded pin lock. As described in view of FIG. 3, supra, universal joint 64 is a universal joint mechanism or a Hooke's coupling that allows rotatory movement from each respective end allowing for various relative angles and displacements between the driver (i.e., second rotational shaft 83 secured to crank 60) and the follower (i.e., first rotational shaft 81). It should be appreciated that second rotational shaft 83 does not need to be connected through connection through-bore 83d of crank frame 30 to crank 60. In alternative embodiments, second rotational shaft 83 may be connected directly to a motor or a structure like crank 60. An illustrative example is shown in FIG. 9.

Universal joint 64 allows a driver (exemplarily shown as second rotational shaft 83) to be positioned in various locations to drive the follower's (exemplarily shown as first rotational shaft 81) rotational movement of first rotational shaft 81 to then move lever arm 80.

The following description should be taken in view of FIGS. 1-7D. FIGS. 7A through 7D illustrate the rotational-angular movement produced by circular-angular lever 100. It should be appreciated that FIGS. 7A through 7D do not illustrate second swing frame 22, universal joint 64, second rotational shaft 83, crank frame 30, or crank 60, as these additional components in a preferred embodiment allow for multi-directional positioning of a driver relative to a follower (i.e., first rotational shaft 81). It should also be appreciated that the driver is any component that is engaged to second end 81b of first rotational shaft 81. Irrespective of the position of the driver, the movements, and functions of circular-angular lever 100, illustrated in FIGS. 7A through 7D, remain the same. Each of the figures includes a representative X, Y, Z axis to illustrate the positional movements of lever arm 80 as first rotational shaft 81 is rotated, where the Z-axis is positioned substantially colinear with a center point of first rotational shaft 81, the X-axis is substantially perpendicular to first support arm 12 and second support arm 14 of support frame 10, and the Y-axis is substantially parallel to connection arm 16 of support frame 10.

Figure 7B:
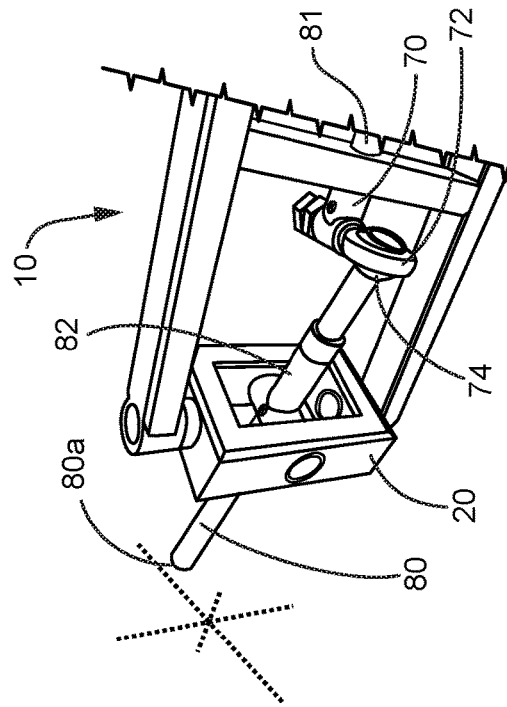
FIG. 7B illustrates a perspective view of the present invention shown in FIG. 7A where the arm is in a leftward position, relative to an axis.
Figure 7D:
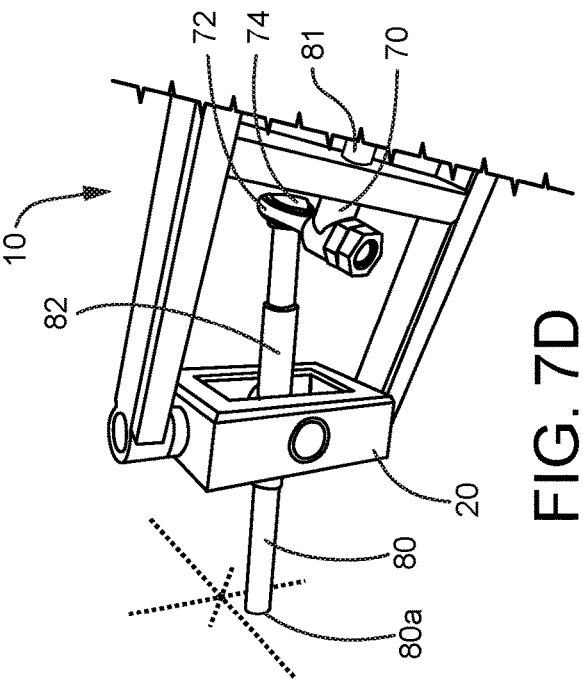
FIG. 7D illustrates a perspective view of the present invention shown in FIG. 7A where the arm is in a rightward position, relative to an axis.
Figure 7A:
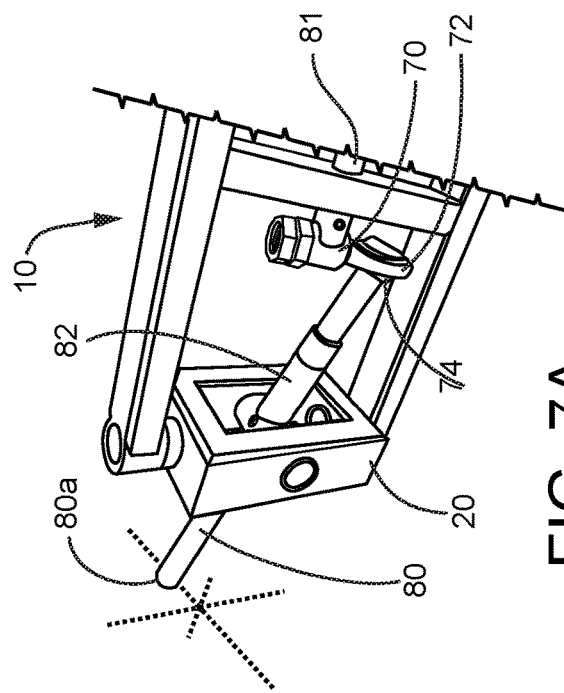
FIG. 7A illustrates a perspective view of the first frame, the second frame, and the first arm of the present invention where the arm is in an upward position, relative to an axis.

FIG. 7A illustrates lever arm 80 of circular-angular lever 100 in an upward position. Specifically, T-swivel connector 82 is tilted in a manner where first end 80a of lever arm 80 is positioned in a positive direction along the Y-axis and is at zero (0) along the X-axis, that is, first end 80a of lever arm 80 is angled upwardly and the opposite end of lever arm 80 is angled downwardly within socket connector 72.

FIG. 7B should be taken in view of the position of lever arm 80 of circular-angular lever 100 shown in FIG. 7A. FIG. 7B illustrates lever arm 80 of circular-angular lever 100 in a rightward oriented position relative to FIG. 7A. Specifically, T-swivel connector 82 is positioned in a substantially parallel position relative to first support arm 12 and second support arm 14 of support frame 10, first swing frame 20 is rotated in a rightward oriented position relative to FIG. 7A, and 90° connector 70 is rotated in a leftward oriented position relative to FIG. 7A. First end 80a of lever arm 80 is positioned in a positive direction along the X-axis and is at zero (0) along the Y-axis, that is, first end 80a of lever arm 80 is angled rightwardly and the opposite end of lever arm 80 is angled leftwardly within socket connector 72. FIG. 7B illustrates how a 90° clockwise rotation of first rotational shaft 81 turns 90° connector 70 while simultaneously pivoting first swing frame 20.

Figure 7C:
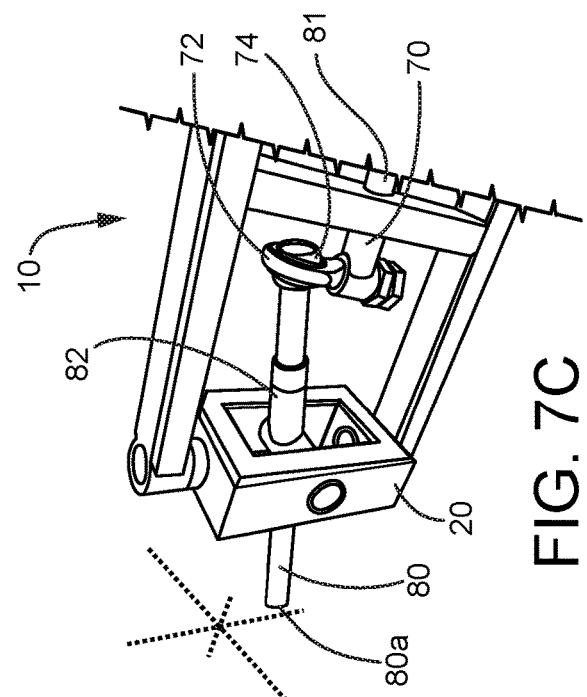
FIG. 7C illustrates a perspective view of the present invention shown in FIG. 7A where the arm is in a downward position, relative to an axis.

FIG. 7C should be taken in view of the positions of lever arm 80 of circular-angular lever 100 shown in FIGS. 7A and 7B. FIG. 7C illustrates lever arm 80 of circular-angular lever 100 in a downwardly oriented position relative to FIG. 7A. Specifically, T-swivel connector 82 is tilted in a manner where first end 80a of lever arm 80 is positioned in a negative direction along the Y-axis and is at zero (0) along the X-axis, that is, first end 80a of lever arm 80 is angled downwardly and the opposite end of lever arm 80 is angled upwardly within socket connector 72. FIG. 7C illustrates how a 180° clockwise rotation of first rotational shaft 81 turns 90° connector 70 and also pivots first swing frame 20 from a neutral position (FIG. 7A) to a pivoted position (FIG. 7B) back to a neutral position in FIG. 7C.

FIG. 7D should be taken in view of the positions of lever arm 80 of circular-angular lever 100 shown in FIGS. 7A-7C. FIG. 7D illustrates lever arm 80 of circular-angular lever 100 in a leftward oriented position relative to FIG. 7A. Specifically, T-swivel connector 82 is positioned in a substantially parallel position relative to first support arm 12 and second support arm 14 of support frame 10, first swing frame 20 is rotated in a leftward oriented position relative to FIG. 7A, and 90° connector 70 is rotated in a rightward oriented position relative to FIG. 7A. First end 80a of lever arm 80 is positioned in a negative direction along the X-axis and is at zero (0) along the Y-axis, that is, first end 80a of lever arm 80 is angled leftwardly and the opposite end of lever arm 80 is angled rightwardly within socket connector 72. FIG. 7D illustrates how a 270° clockwise rotation of first rotational shaft 81 turns 90° connector 70 while simultaneously pivoting first swing frame 20 from a neutral position (FIG. 7A) to a pivoted position (FIG. 7B), back to a neutral position (FIG. 7C), and back to a pivoted position in FIG. 7D.

Figure 8:
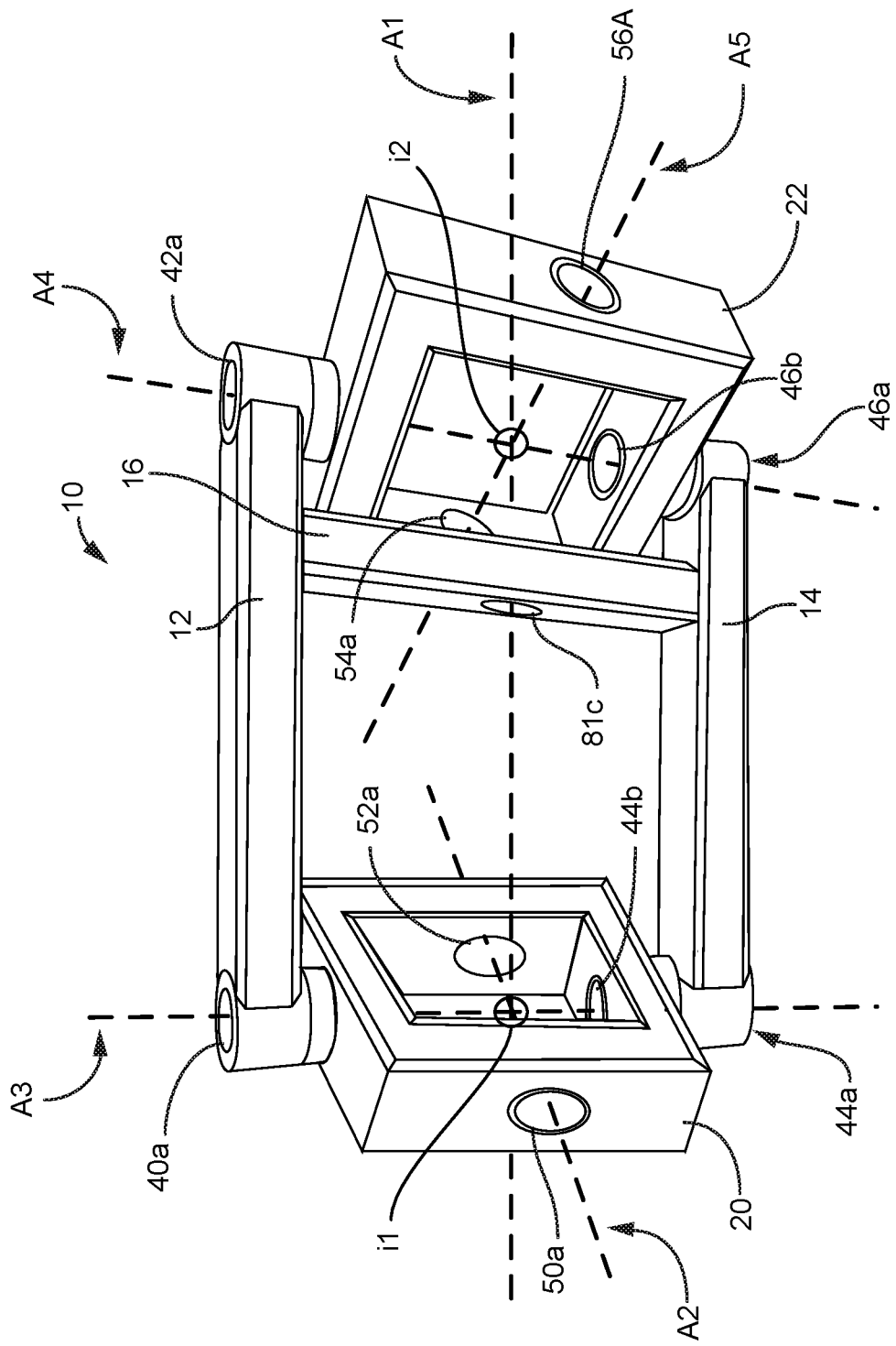
FIG. 8 illustrates a front perspective view of support frame 10, first swing frame 20, and second swing frame 22 illustrating various axes of rotation of the aforementioned components.

The following description should be taken in view of the aforementioned Figures and their corresponding descriptions, supra. FIG. 8 is a front perspective view of support frame 10, first swing frame 20, and second swing frame 22 specifically illustrating various axis of rotation provided by the present invention. Through-bore 81c has a center point that defines first axis of rotation A1. Through-bores 50a and 52a of first swing frame 20 have colinearly arranged center points that define second axis of rotation A2. Through-bores 40a and 44a of support frame 10 and through bores 40b and 44b of first swing frame 20 all have colinearly arranged center points that define third axis of rotation A3. Through-bores 42a and 46a of support frame 10 and through bores 42b and 46b of second swing frame 22 all have colinearly arranged center points that define fourth axis of rotation A4. Through-bores 54a and 56a have colinearly arranged center points that define fifth axis of rotation A5. Although not shown in FIG. 8, it should be appreciated that connection through-bore 83d of crank frame 30 has a center point that defines a sixth axis of rotation.

First axis of rotation A1, second axis of rotation A2, and third axis of rotation A3 all intersect at first intersection i1. First axis of rotation A1, fourth axis of rotation A4, and fifth axis of rotation A5 all intersection at second intersection i2. Additionally, first axis of rotation A1, fourth axis of rotation A4, fifth axis of rotation A5, and a sixth axis of rotation defined by the center point of connection through-bore 83e of crank frame 30 would also all intersection at second intersection i2.

The following description should be taken in view of FIGS. 1 through 8. In order to produce the circular-angular rotation of lever arm 80, swing frame 20, T-swivel connector 82, spherical connector 74 of socket connector 72, and 90° connector 70 all move collectively relative to the rotation of first rotational shaft 81, as described supra. First swing frame 20 is arranged to rotate about pins 40 and 44 within support frame 10, T-swivel connector 82 is arranged to rotate about pins 50 and 52 within first swing frame 20, spherical connector 74 is arranged to rotate within socket connector 72, and 90° connector 70 is arranged to rotate in concert with first rotational shaft 81 within support frame 10.

It should also be appreciated that the movements described in view of FIG. 7A through 7D are merely exemplary. Connecting arm 16 of support frame 10 could be expanded vertically along with first swing frame 20 to produce a more exaggerated movement of lever arm 80. It would be readily apparent to one having ordinary skill in the art that a dimensional increase of all of the components of apparatus 100 would result in a greatly exaggerated movement of lever arm 80, i.e., socket connector 72 of 90° connector 70 being positioned father away from first rotational shaft 81.

The following description should be taken in view of all previous described figures. It should be appreciated that although the pivoting and/or rotatable connected frames of apparatus 100 are generally illustrated to reflect a substantially rectangular frame, that other structural configurations may be contemplated in order to decrease the amount of material required to have a functioning apparatus 100. For example, first swing frame 20 essentially includes four connected members to create a substantially rectangular frame, one could envision first swing frame 20 to alternatively comprise a substantially L-shaped frame, such that there is one horizontal member that comprises through-bore 40b and one vertical member that comprises through-bore 52a. In the alternative construction, T-swivel connector 82 would only rotatably connect to alternative first swing frame 20 at through-bore 52a and support frame 10 would only rotatably connect to alternative first swing 20 at through-bore 40b. One could envision an alternative support frame 10 that would no longer need second support arm 14. The alternative construction may be advantageous for situations were apparatus 100 was suspended from support arm 12 and a decrease in overall weight would be ideal for moving apparatus 100 into positions for use.

Walking Apparatus

FIG. 9 illustrates a perspective view of walking apparatus 200 comprised of apparatuses 110, 112, and 114 joined together and connected to gear box 130. The description of apparatus 200 should be taken in view of all of the previously described figures. Apparatuses 110, 112, and 114 comprise the same components as circular-angular lever device 100, described supra, with the addition of other components described infra. Lever arm 80 of circular-angular device 110 is threadably connected to connecting aperture 162a of first walking leg 160a via securement means 166a of walking leg 160a. Securement means 166a in a preferred embodiment are substantially identical to the threaded pin lock, described supra. First walking leg 160a is attached to foot 164a. Although not indicated in FIG. 9, apparatuses 112 and 114 include the same "walking components" (walking leg 160a, connecting aperture 162a, and foot 164a) as apparatus 110 and are designated with "b" and "c", respectively. Similarly, second walking leg 160b and foot 164b is threadably connected to lever arm 80 of circular-annular device 112, and third walking leg 160c and foot 164c is threadably connected to lever arm 80 of circular-angular device 114. As shown, apparatuses 110 and 114 are both in the position shown in FIG. 7C, such that foot 164a and foot 164c are in the downward direction that would be contacting a ground surface, and apparatus 112 is in the position shown in FIG. 7A, such that foot 164b is in the upward direction that would not be contacting a ground surface.

It should be appreciated that legs 160a, 160b, 160c may include spring-loaded components so that there may be a suspension-effect of legs 160a, 160b, 160c when their respective feet contact a ground surface. The feet, 164a, 164b, 164c, may also include spring-loaded components to further increase the shock absorption.

Apparatus 110 has gear shaft 142 of gear 140 secured to second end 81b of first rotational shaft 81 (not shown). Apparatuses 112, and 114 also have respective gears that are substantially identical to gear 140 that are secured to their respective first rotational shafts. Chain 150 connects all the gears of apparatuses 110, 112, and 114, such that they all move in concert thereby rotating the lever arms of apparatuses 110, 112, and 114, collectively.

In an ideal embodiment, additional apparatuses with positions opposite of apparatuses 110, 112, and 114, reflectively arranged in relation to line R, are joined together and connected via their respective gear box to the open face 130a of gear box 130—these additional apparatuses are substantially enantiomers (i.e., mirror images of each other) of apparatuses 110, 112, and 114. One could envision gear box 130 and an adjacent and reflectively arranged gear box being fixedly secured to face 130a of gear box 130. One with ordinary skill in the art could envision a reflectively arranged configuration of apparatus 200 in relation to line R (although not shown, one with ordinary skill in the art would ascertain the positional relationships of reflectively arranged apparatuses $110_1$, $112_1$, $114_1$ of apparatus $200_1$, thusly "1" will designate reflectively arranged components in relation to line R discussed hereafter. In other words, "1" will designate the enantiomers of apparatuses 110, 112, and 114, discussed infra). For example, open face 130a of gear box 130 of walking apparatus 200 would be fixedly secured to reflectively arranged open face 130a1 of gear box $130_1$ of (reflectively arranged) walking apparatus $200_1$.

The apparatuses directly across from apparatuses 110 and 114, apparatus $110_1$ and $114_1$, are in the position shown in FIG. 7A and described supra, whereas the apparatus directly across from apparatus 112, apparatus $112_1$, is in the position shown in FIG. 7C and described supra. It should be appreciated that the illustration of walking apparatus 200 is merely exemplary. One with ordinary skill in the art would understand that second swing frame 22 and crank frame 30 could be joined to apparatuses 110, 112, 114 (and $110_1$, $112_1$, $114_1$) whereas first rotational shaft 81 is further engaged to universal joint 64 and second rotational shaft 83 would be within through-bore 83d. In this alternative embodiment, end 83b of second rotational shaft 83 would be engaged to gear 140 and second swing frames 22 of apparatuses 110, 112, 114 (and $110_1$, $112_1$, $114_1$) would be secured to gear box 130 (and $130_1$).

Further, the positioning of the walking legs 160a, 160b, and 160c in relation to the walking legs on the reflective apparatuses ($110_1$, $112_1$, $114_1$) allows walking apparatus 200 to move in the forward and backward direction, depending on the direction applied to gear 140 and $140_1$. This movement of six legs is similar to a tripod gait.

However, it should be appreciated that combined walking apparatus 200 and walking apparatus $200_1$ is not limited to three apparatuses on its respective side, rather that it requires at least three legs on each respective side, such that the combination of six apparatus always has three legs that are contacting a ground surface and three legs that are not contacting a ground surface. In an example of combined walking apparatus 200 and walking apparatus $200_1$ having four apparatuses on each side, or eight collectively, there would always be four legs that are contacting a ground surface and four legs that are not contacting a ground surface.

Combined walking apparatus 200 and walking apparatus $200_1$ includes apparatuses 110, 112, 114 (and $110_1$, $112_1$, $114_1$). Thus, gears 140 and $140_1$ of apparatus 110 and $110_1$ would both engage a crank-type member at D, preferably in between 142 and $142_1$, to engage 142 and $142_1$, respectively. The crank type member could be a motor that would power gears 140 and $140_1$ and engage chains 150 and $150_1$ to collectively move the gears of 110, 112, 114 (and $110_1$, $112_1$, $114_1$), respectively.

(Example 1): In some embodiments, the present invention may comprise a walking machine having apparatuses for translating movement of a rotating shaft to rotational movement in two dimensions of a lever arm: a plurality of apparatuses for translating movement of a rotating shaft to rotational movement in two dimensions of a lever arm, each apparatus comprises: a first frame arranged to hold a drive shaft, a second frame rotatably connected to said first frame, said second frame arranged to pivotably hold a follower arm; an extension secured to said drive shaft, said follower arm rotatably connected to said extension at a first end; said drive shaft connected to a gear; and, a leg having a foot, said leg connected to said follower arm at a second end, wherein a first at least three apparatuses are connected via a cross member secured to said first frame; wherein a second at least three apparatuses are connected via a cross member secured to said first frame; said second at least three apparatuses are reflectively arranged across from said first at least three apparatuses; and, wherein said first at least three apparatuses cross member and said second at least three apparatuses cross member are connected via a merging member.

(Example 2): In other arrangements, the walking machine having apparatuses for translating movement of a rotating shaft to rotational movement in two dimensions of a lever arm recited in Example 1, supra, wherein each of said gears of said first at least three circular angular rotation levers are engaged to a chain, and wherein each of said gears of said second at least three circular angular rotation levers are engaged to a chain.

(Example 3): In further embodiments, the walking machine having apparatuses for translating movement of a rotating shaft to rotational movement in two dimensions of a lever arm recited in Example 2, supra, wherein one of said gears of said first at least three circular angular rotation levers is engaged to a shaft, said shaft driven by a motor, and wherein one of said gears of said second at least three circular angular rotation levers is engaged to said shaft, said shaft driven by said motor.

Adjustable Circular-Angular Lever Apparatus

Figure 10:
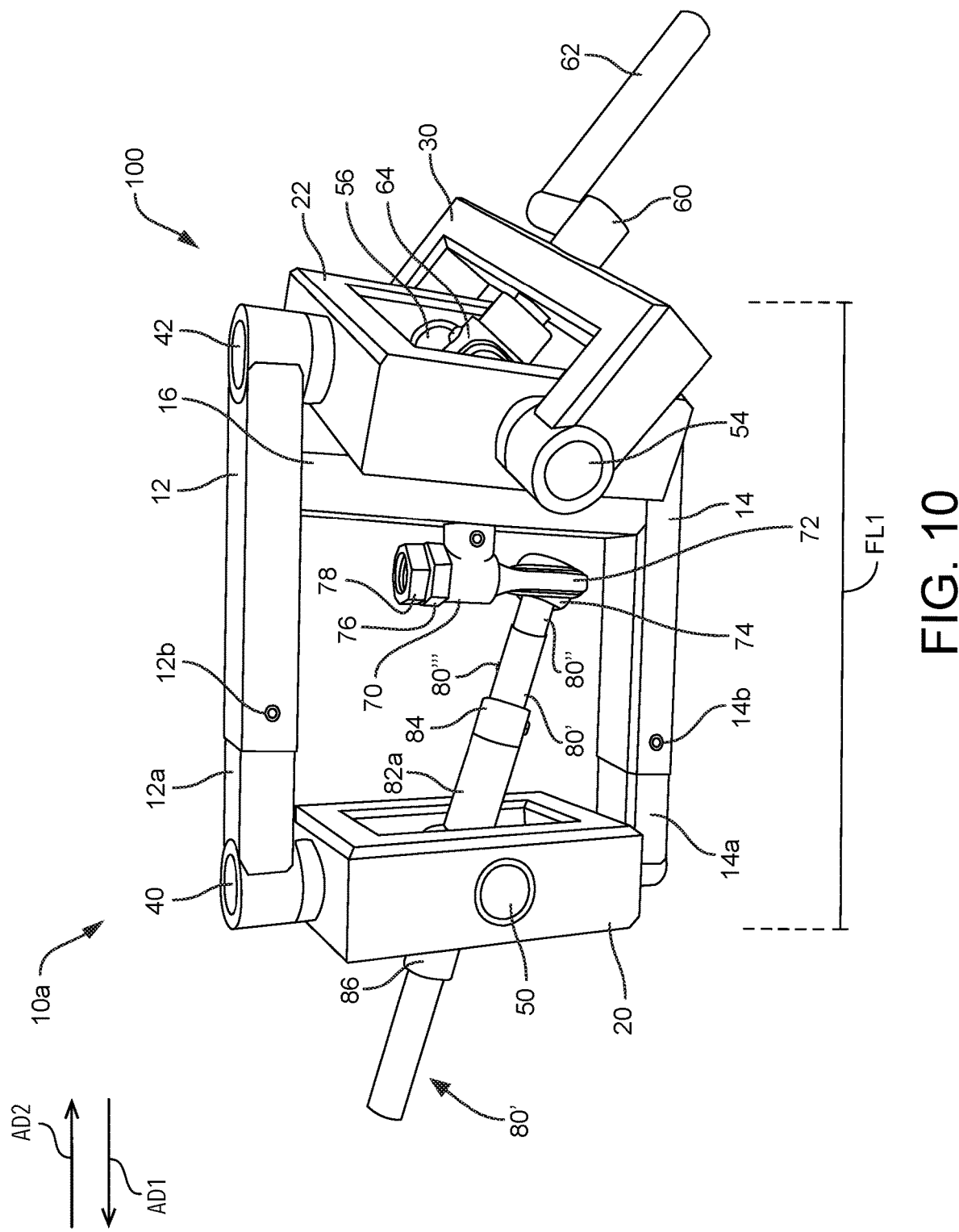
FIG. 10 illustrates a perspective view of a second embodiment of the present invention; and, FIG. 11 illustrates the invention shown in FIG. 10 in an adjusted configuration.
Figure 11:
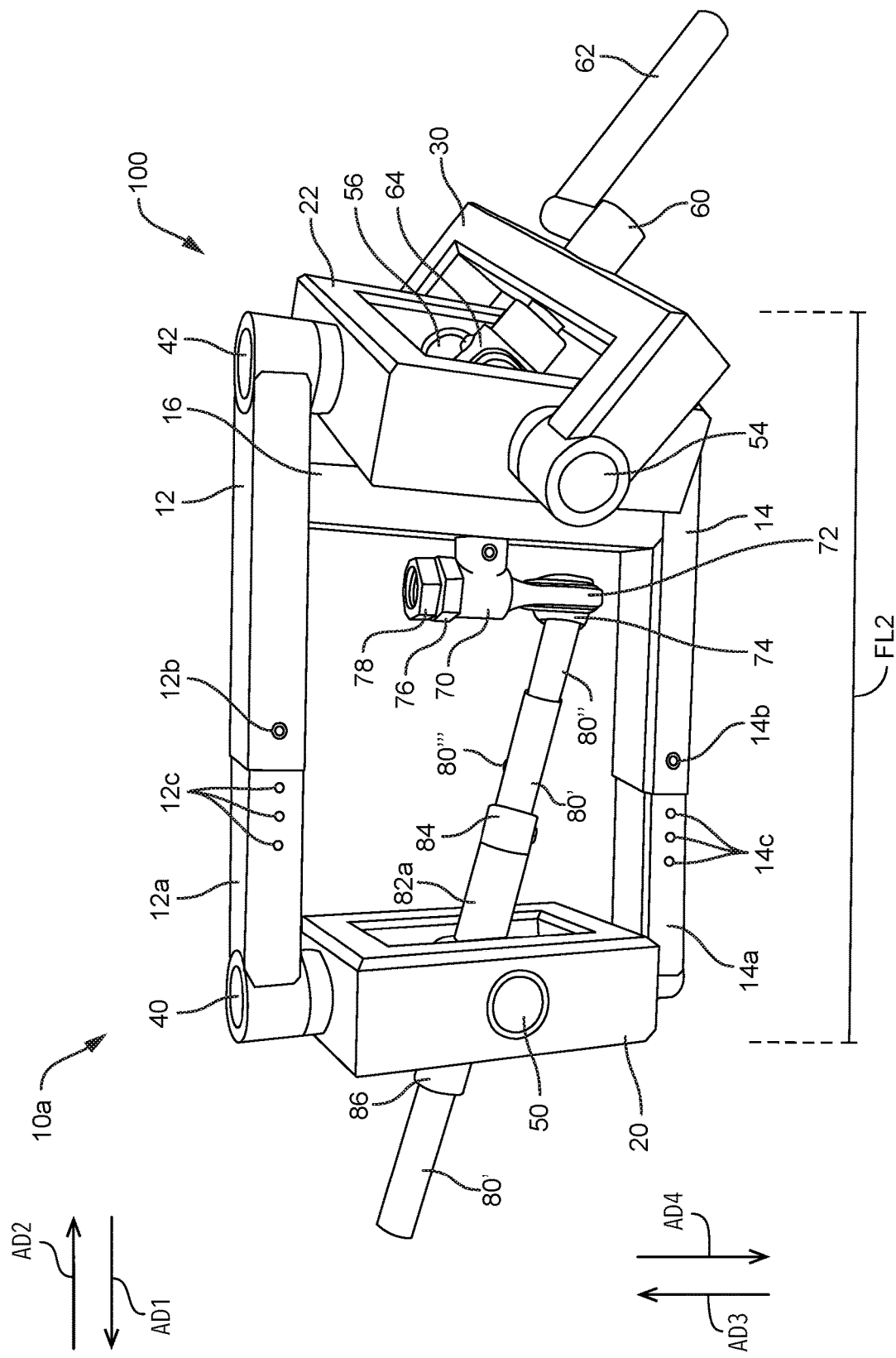

Adverting now to FIGS. 10 and 11 which generally illustrate an adjustable embodiment of the present invention. The invention shown in FIGS. 10 and 11 generally includes all of the aforementioned components described in FIGS. 1-9. Apparatus 100, as shown, includes adjustable frame 10a, which includes adjustably-configured support arms 12' and 14'. First adjustable support arm 12' includes adjustable portion 12a which is arranged to slidably move within first adjustable support arm 12', i.e., telescoping. Adjustable portion 12a includes plurality of locking apertures 12c therein, whereas locking pin 12b of first adjustable support arm 12' engages one of the apertures to fix adjustable portion at a desired length relative to first adjustable support arm 12'. Second adjustable support arm 14' includes adjustable portion 14a which is arranged to slidably move within second adjustable support arm 14', i.e., telescoping. Adjustable portion 14a includes plurality of locking apertures 14c therein, whereas locking pin 14b of second adjustable support arm 14' engages one of the apertures to fix the adjustable portion at a desired length relative to second adjustable support arm 12'. First frame length FL1 generally demonstrates adjustable portions 12a and 14a in a shortened or collapsed configuration, whereas second frame length FL2, generally demonstrates adjustable portions 12a and 14a in an elongated or expanded configuration. This configuration allows adjustable frame 10a to change lengths in axial directions AD1 and AD2. Generally, second frame length FL2 is greater than first frame length FL1.

Apparatus 100, shown in FIGS. 10 and 11 also includes adjustable lever arm 80'. Adjustable lever arm 80' may be configured to accept adjustable portion 80" therein. Adjustable lever arm 80' includes locking means 80'" which removably engage adjustable portion 80" to fix adjustable portion 80" (and therefore adjustable lever arm 80') at a desirable length. Locking means 80'" maybe configured to be a threaded pin lock, as described supra, where adjustable portion 80'" could include a plurality of apertures that accept locking means 80'".

It should be noted that connecting arm 16, first swing frame 20, second swing frame 22, and/or crank frame 30 could all be modified to include adjustable configurations substantially similar to adjustable support arms 12' and 14', such that adjustable frame 10a could also be adjusted in axial directions AD3 and/or AD4.

Thus, it is seen that the objects of the invention are efficiently obtained, although modifications and changes to the invention may be readily imagined by those having ordinary skill in the art, and these changes and modifications are intended to be within the scope of the claims.

REFERENCE NUMBERS

10 H-frame/support frame
10a Adjustable H-frame/support frame
12 First support arm
12' First adjustable support arm
12a Adjustable portion of first adjustable support arm 12'
12b Locking pin of first adjustable support arm 12'
12c Locking apertures of adjustable portion of first support arm 12a
14 Second support arm
14' Second adjustable support arm
14a Adjustable portion of second adjustable support arm 12'
14b Locking pin of second adjustable support arm 12'
14c Locking apertures of adjustable portion of second support arm 14a
16 Connecting arm
20 First swing frame
22 Second swing frame
30 Crank frame
40 First pin of H-frame/support frame 10
40' First end of pin 40
40" Second end of pin 40
40a Through-bore of first support arm 12
40b First through-bore of first swing frame 20
41 Groove of pin 40
42 Second pin of H-frame/support frame 10
42a through-bore of second support arm 12
42b First through-bore of second swing frame 22
44 Third pin of H-frame/support frame 10
44a First through-bore of second support arm 14
44b Second through-bore of first swing frame 20
46 Fourth pin of H-frame/support frame 10
46a Second through-bore of second support arm 14
46b Second through-bore of second swing frame 22
50 First pin of first swing frame 20
50a First through-bore of first swing frame 20
52 Second pin of first swing frame 20
52a Second through-bore of first swing frame 20
54b First pin through-bore of crank frame 30
54 First pin of second swing frame 22
54a First through-bore of second swing frame 22
56 Second pin of second swing frame 22
56a Second through-bore of second swing frame 22
56b Second pin through-bore of crank frame 30
60 Crank
61 Pin through-bore
62 Handle of crank 60
64 Universal joint
66 Pin through-bore
68 Pin through-bore
70 90° connector
70a Rotational shaft through-bore of 90° connector 70
70b Socket connector through-bore of 90° connector 70
72 Socket connector
72a Threaded shaft of socket connector 72
74 Spherical connector of socket connector 72
76 First lock nut
78 Second lock nut
80 Lever arm
80' Adjustable lever arm
80" Adjustable portion of adjustable lever arm 80'
80'" Securement means of adjustable lever arm 80'
80a First end of lever arm 80
80b Rotation end of lever arm 80
81 First rotation shaft
81a First end of first rotation shaft 81
81b Second end of first rotation shaft 81
81c through-bore of connecting arm 16
81d First connection aperture of universal joint 64
82 T-swivel connector
82a First lever arm through-bore of T-swivel connector 82
82b Second lever arm through-bore of T-swivel connector 82
82c First pivot through-bore of T-swivel connector 82
82d Second pivot through-bore of T-swivel connector 82
83 Second rotation shaft
83a First end of second rotation shaft 83
83b Second end of second rotation shaft 83
83c Second connection aperture of universal joint 64
83d Connection through-bore of crank frame 30
83e Connection through-bore of crank 60
84 First shaft collar of lever arm 80
86 Second shaft collar of lever arm 80
90, 92 . . . Threaded pins
90' Exposed end of threaded pin 90
90a, 92a . . . . Threaded pin through-bores
100 Circular-angular lever apparatus
110, 112 . . . Circular-angular lever apparatus
120 First connecting arm
122 Second connecting arm
130 Gearbox
130a Outside face of gearbox 130
140 Gear
142 Gear shaft of gear 140
150 Chain
160 Plurality of walking legs
160a First walking leg
160b Second walking leg
160c Third walking leg
162a Connecting aperture of walking leg 160a
162b Connecting aperture of walking leg 160b
162c Connecting aperture of walking leg 160c

164a Foot of walking leg 160a
164b Foot of walking leg 160b
164c Foot of walking leg 160c
166a Securement means of walking leg 160a
166b Securement means of walking leg 160b
166c Securement means of walking leg 160c
200 Walking apparatus
A1 First axis of rotation
A2 Second axis of rotation
A3 Third axis of rotation
A4 Fourth axis of rotation
A5 Fifth axis of rotation
AD1 First axial direction
AD2 Second axial direction
AD3 Third axial direction
AD4 Fourth axial direction
D Location of crank-type member
FL1 First frame length
FL2 Second frame length
i1 First intersection
i2 Second intersection
L Exposed length of pin 40
R Reflection line

What is claimed is:

1. An apparatus for translating movement of a rotating shaft to rotational movement in two dimensions of a lever arm, comprising:
   a first frame having an adjustable length;
   a second frame rotatably connected to said first frame;
   a first shaft rotatably connected to said first frame and arranged for rotation about a first axis of rotation;
   a heim joint fixedly secured to a distal end of said first shaft;
   an adjustable-length lever having a fulcrum, said lever having a first end and a second end, where a distance between said fulcrum and said first end is less than a distance between said fulcrum and said second end, said first end of said lever rotatably connected to said heim joint;
   wherein said fulcrum is arranged within said second frame and arranged for pivoting about a second axis of rotation, wherein said second axis of rotation is co-planar with said first axis of rotation,
   wherein said second frame arranged for rotation with respect to said first frame about a third axis of rotation, wherein said third axis of rotation is arranged perpendicularly and spaced apart from said first axis of rotation,
   wherein said first, second, and third axes have single point of intersection.

2. The apparatus for translating movement of a rotating shaft to rotational movement in two dimensions of a lever arm recited in claim 1, further comprising a third frame rotatably connected to said first frame, wherein said third frame is rotatably connected to said first frame, said third frame arranged for rotation with respect to said first frame about a fourth axis of rotation, wherein said fourth axis of rotation is arranged perpendicularly and spaced apart from said first axis of rotation.

3. The apparatus for translating movement of a rotating shaft to rotational movement in two dimensions of a lever arm recited in claim 2, further comprising a fourth frame pivotably connected to said third frame, wherein said fourth frame arranged for rotation with respect to said third frame about a fifth axis of rotation, wherein said fifth axis of rotation is arranged perpendicularly from said fourth axis of rotation, wherein said fifth axis is co-planar with said first axis of rotation.

4. The apparatus for translating movement of a rotating shaft to rotational movement in two dimensions of a lever arm recited in claim 3, wherein said first, fourth, and fifth axes of rotation have a single point of intersection.

5. The apparatus for translating movement of a rotating shaft to rotational movement in two dimensions of a lever arm recited in claim 4, further comprising a second shaft rotatably connected to said fourth frame and arranged for rotation about a sixth axis of rotation.

6. The apparatus for translating movement of a rotating shaft to rotational movement in two dimensions of a lever arm recited in claim 5, wherein said first, fourth, fifth, and sixth axes of rotation have a single point of intersection.

7. The apparatus for translating movement of a rotating shaft to rotational movement in two dimensions of a lever arm recited in claim 5, wherein said second shaft is pivotably connected to said first shaft.

8. The apparatus for translating movement of a rotating shaft to rotational movement in two dimensions of a lever arm recited in claim 7, wherein said first shaft is connected to said second shaft via a universal joint.

* * * * *